United States Patent [19]
Vander Horst et al.

[11] 3,889,484
[45] June 17, 1975

[54] GAS DRYING METHOD AND APPARATUS

[75] Inventors: John Vander Horst, Lakewood; Robert F. Hounshell, Sedalia; Myron Dunn, Littleton, all of Colo.

[73] Assignee: Wilkerson Corporation, Englewood, Colo.

[22] Filed: Jan. 30, 1974

[21] Appl. No.: 437,862

[52] U.S. Cl. .............................. 62/5; 62/86; 62/93
[51] Int. Cl. ............................................ F25b 9/02
[58] Field of Search ........................................... 62/5

[56] References Cited
UNITED STATES PATENTS

| | | | |
|---|---|---|---|
| 2,522,787 | 9/1950 | Hughes | 62/5 |
| 2,683,972 | 7/1954 | Atkinson | 62/5 |
| 2,741,899 | 4/1956 | VonLinde | 62/5 |
| 2,807,156 | 9/1957 | Van Dongen | 62/5 |

*Primary Examiner*—William J. Wye
*Attorney, Agent, or Firm*—Burton, Crandell & Polumbus

[57] ABSTRACT

A self-contained gas drying method and apparatus for removing fluids from high pressure wet gases preparatory to delivering same at a substantially reduced near constant working pressure. A double-pass heat exchanger receives incoming wet gas from a high pressure source thereof and passes it in heat exchange relation to an already dried cold fraction of the same gas issuing from the cold side of a vortex tube. The condensate thus removed from the wet gas is trapped in a separator downstream of the heat exchanger preparatory to delivering the incoming gas thus cooled and dried to the inlet of the vortex tube. The hot gas fraction from the hot side of the vortex tube is passed through a flow constriction device downstream of the latter before it is recombined with the cold fraction coming from the heat exchanger. The recombined fractions are then passed through a pressure relief valve which controls the pressure and maintains it substantially constant at a preselected level well below that of the supply pressure while dumping any excess gas over and above that acquired to satisfy downstream demands to the atmosphere.

4 Claims, 1 Drawing Figure

GAS DRYING METHOD AND APPARATUS

BACKGROUND OF THE INVENTION

Compressed air used for pneumatic instrumentation is, under ordinary circumstances, supplied at a pressure well in excess of the working pressure. For instance, air is normally compressed to 80 to 100 psig preparatory to being supplied to instrumentation that operates at only 15 psig or so. If no drying of the air is required, it is usually passed through some type of pressure regulating device to lower the supply pressure to the desired working pressure. By lowering the pressure through a pressure regulating valve, a reduction in pressure is the only useful end achieved notwithstanding the fact that some energy was wasted in the process. If, on the other hand, the air must be dried before it can be used, either additional energy must be supplied to do so or, alternatively, instead of wasting the energy dissipated when the air moves from a relatively high energy level to a lower one, this source of energy should be tapped and used for purposes of removing some of the water.

Probably the most effective of the prior art systems for drying air that required no external energy input but relied solely upon the available energy resulting from the drop in its pressure were those which incorporated a vortex tube together with, as a minimum, some sort of heat exchanger, a separator or trap to receive the condensate and a flow constricting element usually in the form of a fixed or variable orifice, all of which were connected together in the form of a closed circuit. High pressure air entering the system was passed in heat-exchange relation to the cold air fraction issuing from the cold side of the vortex tube and the condensate was then trapped in the separator which was located between the latter and the heat exchanger. The air thus dried comprised the input to the vortex tube. The cold air issuing from the vortex tube after being warmed in the heat exchanger was remixed with hot air issuing from the hot air outlet of the vortex tube after the latter had been passed through a suitable flow constricting orifice. The partially dried air mixture thus formed comprised the source of air for the pneumatic instrumentation downstream of the system and its working pressure at the point of use was a function of both the supply pressure to the system and the capacity of the vortex tube.

Systems such as those outlined above lack sufficient control of the working pressure to be satisfactory for use as a source of dried air for pneumatic instrumentation, the latter requiring a uniform pressure remaining constant at a specified level for best results. The solution to this problem was first thought to be merely adding a pressure regulator on the downstream end of the system operative to take the dried air mixture and reduce its pressure to the desired level. Solution of one problem, however, created another in that suitable pressure regulation demanded a pressure drop of 5 to 10 p.s.i. across the regulator and this meant the vortex tube was subjected to a back pressure significantly greater than that which it saw in the system without the regulator. Since the performance of a vortex tube is a function of the inlet and outlet pressures, the considerable reduction in the differential pressure thereacross due to the inclusion of the pressure regulator materially and adversely affected the drying capacity of the system.

Another attempt at solving this problem was to eliminate the pressure regulator at the downstream end of the system and relocating it at the inlet end of the system while making it responsive to the outlet pressure. Once again, unsatisfactory de-humidification of the air resulted because it was found that a considerable reduction in inlet pressure was required to effect even a modest reduction in flow volume.

A further variation in this volumetric method of controlling the outlet pressure was to place the pressure regulator downstream of the separator and such a system is in widespread use as well as being currently available. It has an advantage over the system where the regulator is placed at the inlet in that the air is cooled at the maximum available pressure thus permitting condensation of a relatively greater amount of water vapor at a given temperature. Despite this fact, however, the system suffers from the same basic problem as the previously-described system in which the outlet pressure was regulated in that the differential pressure across the vortex tube is reduced to a significant degree thereby lowering its refrigerating ability.

Still another method of limiting the overall flow through the dryer is by switching the flow on and off in stepwise fashion instead of modulating the pressure of the air feeding the vortex tube or regulating the outlet pressure. The theory behind such a system is that the full available pressure differential across the vortex tube will be available thus maximizing the air drying capacity of the latter. While this is true, the air available for use will either be interrupted or, at best, fluctuating as far as its pressure is concerned when, as previously noted, the working air should preferably be maintained at a near constant pressure and at a pre-set level. On the other hand, if in the above system the frequency of the fluctuations in pressure is so rapid and of such magnitude as to remain within acceptable limits as far as the downstream instrumentation is concerned, then it will be found that instead of maximizing the available pressure drop across the vortex tube as intended, it will see an upstream pressure somewhat lower than the supply pressure and not materially different than that it would see if the on-off valve were replaced by an upstream pressure regulator in the manner already described.

OBJECTS AND SUMMARY OF THE INVENTION

It is the principal object of the present invention to provide a novel and greatly improved vortex-tube type air drying apparatus for use with pneumatic systems where the working pressure is considerably less than the supply pressure.

A second objective of the within-described invention is the provision of an apparatus of the type aforementioned that requires no external supplementary energy input to accomplish the drying function.

Another object is to provide an air drying system incorporating a vortex tube wherein the pressure differential across the latter is maximized within the available limits of the supply and working pressures.

Still another objective of the invention to provide an improved method and apparatus for drying wet gases that is automatically operative to accomplish the maximum degree of dehumidification possible under the operating parameters of the pneumatic system while, at the same time, supplying the demands thereof at a constant and carefully regulated pressure.

An additional object is to provide an air dehumidification method which, matches the flow characteristics of the vortex tube to the normal downstream system demands.

Further objects are to provide a compressed air dehumidification system that is simple, inexpensive, compact, versatile, dependable, easy to service and readily adaptable to various working pressures.

Other objects and advantages of the present invention will become apparent from the following description and accompanying drawing.

In accordance with the foregoing objects, the undesirable features of the prior art air drying systems of the type utilizing a vortex tube, a heat exchanger, a trap and a flow control orifice can, in large measure, be eliminated by the simple, yet unobvious, expedient of placing a simple pressure relief valve between the system and the pneumatic instrumentation utilizing the dried air issuing therefrom while, at the same time, closely matching the flow capacity of the vortex tube to the downstream demand thereby minimizing the air losses through the relief valve. When this is done, the total available pressure differential will be impressed across the vortex tube which condition, as is well known, maximizes the refrigerating capacity of the system and thus insures that as much as the moisture as can be removed from the air at the particular temperature at which the system is being operated has been taken out. The air delivered to the downstream instrumentation will be furnished at a constant and carefully controlled pressure.

DESCRIPTION OF THE DRAWING

The single FIGURE of the drawing depicts the air-drying apparatus of the invention in schematic form.

DESCRIPTION OF THE PREFERRED EMBODIMENT

Figure 1:
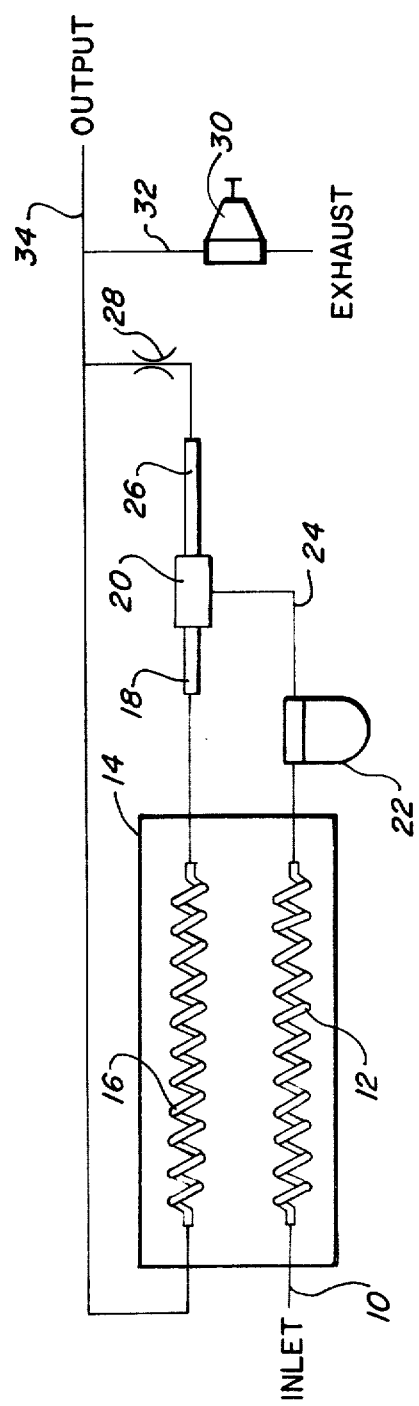

Referring to the drawing there is shown a supply line 10 carrying compressed air at an elevated pressure say, for example, 80 to 100 psig. It is connected into one pass or coil 12 of a conventional heat exchanger 14, the other pass 16 of which carries air from the cold side 18 of vortex tube 20 alongside thereof in countercurrent flow relation as illustrated. While countercurrent flow is preferred, a concurrent flow exchanger can also be used in accordance with well known heat transfer mechanics. In any event, the relatively hot wet incoming stream of supply gas is passed in heat exchange relation alongside the cold substantially drier fraction issuing from the cold side of the vortex tube so as to cool the former and condense a portion of the moisture contained therein. The condensate is trapped in conventional separator 22 preparatory to delivering the cool partially dehumidified stream through conduit 24 to the center tap of the vortex tube 20.

The cold side 18 of the vortex tube delivers cold relatively dry air to the upper pass 16 of the heat exchanger 20 while the hot side 26 thereof delivers warm air to orifice 28 which is effective to restrict the flow from the hot side which, in turn, controls the temperature of the air leaving the cold side. Orifice 28 can be either of the fixed or variable type, the latter being preferred as it obviously provides somewhat greater control over the drying operation. As the warmed air stream from the cold side of the vortex tube leaves the upper pass 16 of the heat exchanger, it is recombined with the stream from the hot side of the vortex tube downstream of orifice 28.

Up to this point, the vortex tube dryer is largely conventional and, as previously noted, unsatisfactory for several reasons which needn't be repeated. The most important features of the instant apparatus is, therefore, the addition of pressure relief valve 30 in branch 32 of main low pressure supply line 34 which carries the relatively drier air as a substantially reduced working pressure to the point of use. Relief valve 30 is, preferably, of the conventional diaphragm operated type which, due to its large sensing area relative to the valve size, permits close control of the working pressure. While relief valve 30 has been shown with the inlet thereto connected in a branch line 32 and its outlet open to the atmosphere, it is to be understood that a valve of the same type having both inlet and outlet ports in addition to the pressure relief port could, without the exercise of invention, be substituted for the one shown and be placed directly in the main low pressure supply line 34.

One other significant feature of the invention and is the desirability of carefully and closely matching the capacity of the vortex tube 20 to the downstream demands of the system so that sufficient air is supplied to answer such demands while maintaining the preselected working pressure substantially constant and, at the same time, exceeding same minimally so that as little air is dumped to the atmosphere as is reasonably possible. Fortunately, vortex tubes are easily matched in flow capacity to demand by a simple exchange of internal parts. Also, downstream demands in most penumatic control systems remain quite constant as does the supply pressure, about the only surges coming when the compressor cuts in and out of the system.

Finally, as far as the drying capacity of the system is concerned, it can be shown that to maximize the cooling efficiency, it is desirable within the limits set by the available supply pressure and the necessary working pressure that the ratio of input pressure to output pressure be kept as large as possible.

What is claimed is:

1. The gas drying apparatus which comprises: a double-pass heat exchanger having the inlet to its first pass connectable to a high pressure supply of wet gas, a separator effective to collect the condensate removed by the heat exchanger connected to receive the relatively cooler partially dried gas issuing from the first pass thereof, a vortex tube operative to split an incoming stream of gas into a relatively colder fraction and a relatively hotter fraction connected to receive the partially dried gas from the separator and deliver the colder fraction thereof to the second pass of the heat exchanger for movement therein in heat exchange relation to the gas moving through the first pass thereof preparatory to recombining said colder and hotter fractions, a flow constrictor connected to restrict the flow of the relatively warmer fraction issuing from the vortex tube operative to effectively control division of flow within the latter, and a pressure relief valve connected to receive the recombined fractions, said relief valve being automatically operative to maintain a working pressure at a level substantially less than the supply pressure by bleeding off excessive air to the atmosphere while at the same time maintaining a near maximum pressure differential across the vortex tube within the available limits.

2. The gas drying apparatus as set forth in claim 1 in which: the flow capacity of the vortex tube and the setting of the pressure relief valve are matched to the downstream demands such that the working pressure is maintained substantially constant at a level effective to minimize air losses.

3. The method of drying a wet gas from a high pressure source thereof preparatory to delivering same to satisfy downstream demands at a substantially lower pressure which comprises the steps of: condensing a portion of the moisture from the incoming wet gas by passing it in heat exchange relation to a relatively colder and dried fraction of the same gas issuing from the cold side of a vortex tube, stripping the moisture from the stream thus cooled preparatory to delivering same to the inlet of the vortex tube as the supply therefor, restricting the flow of the stripped relatively hotter fraction of the same gas issuing from the hot side of the vortex tube peparatory to recombining same with the relatively cooler fraction thereof, and bleeding off to the atmosphere the minimum amount of the recombined fractions as will function to maintain a supply thereof at or near the lowest pressure that can be kept substantially constant yet which will still produce near maximum drying action by impressing at or near the maximum available pressure differential across the vortex tube.

4. The method as set forth in claim 3 which includes the step of matching the capacity of the vortex tube to the normal downstream demands.

* * * * *